United States Patent [19]

Charles et al.

[11] Patent Number: 5,328,736
[45] Date of Patent: Jul. 12, 1994

[54] APPARATUS AND PROCESS FOR IMPREGNATING FIBERS WITH AN AEROSOL OF ELECTROSTATICALLY CHARGED POLYMER POWDER PARTICLES

[75] Inventors: Alain Charles, Champigny/Marne; Emile Morel, Paris, both of France

[73] Assignee: Societe Nationale des Poudres et Explosifs, Paris, France

[21] Appl. No.: 934,455

[22] PCT Filed: Mar. 14, 1991

[86] PCT No.: PCT/FR91/00207
§ 371 Date: Sep. 10, 1992
§ 102(e) Date: Sep. 10, 1992

[87] PCT Pub. No.: WO91/14044
PCT Pub. Date: Sep. 19, 1991

[30] Foreign Application Priority Data
Mar. 15, 1990 [FR] France ................ 90 03346

[51] Int. Cl.⁵ ................ B05D 1/06; B05B 5/14
[52] U.S. Cl. ................ 427/459; 427/482; 427/485; 118/309; 118/312; 118/634; 118/DIG. 5
[58] Field of Search ............ 427/185, 195, 459, 461, 427/482, 485, 486; 118/309, 312, 629, 630, 634, DIG. 5

[56] References Cited

U.S. PATENT DOCUMENTS

| | | | |
|---|---|---|---|
| 2,478,939 | 8/1949 | Dover . | |
| 3,396,699 | 8/1968 | Beebe et al. | 427/459 |
| 3,670,699 | 6/1972 | Sargent | 427/459 |
| 3,817,211 | 6/1974 | Brown et al. | 118/630 |
| 4,008,685 | 2/1977 | Pierce | 118/629 |
| 4,069,792 | 1/1978 | Nethersole et al. | 118/309 |
| 5,123,373 | 6/1992 | Iyer et al. | 118/309 |

FOREIGN PATENT DOCUMENTS

| | | | |
|---|---|---|---|
| 0246167 | 11/1987 | European Pat. Off. . | |
| 1444082 | 11/1968 | Fed. Rep. of Germany . | |
| 2708032 | 9/1977 | Fed. Rep. of Germany | 118/629 |
| 3525404 | 1/1987 | Fed. Rep. of Germany . | |
| 1530155 | 5/1968 | France . | |
| 1539311 | 9/1968 | France | 118/DIG. 5 |
| 8700563 | 1/1987 | PCT Int'l Appl. . | |

Primary Examiner—Terry J. Owens
Attorney, Agent, or Firm—Remy J. VanOphem

[57] ABSTRACT

Apparatus and continuous process for impregnating fibers with polymer powders in which the fibers are caused to circulate in an aerosol passed through a fluidized bed contained in an earthed fluidization vessel. The particles constituting the fluidized bed are chosen so as to charge the powder particles electrostatically. The aerosol is continuously fed with a flow of fresh powder particles equal to that at which it is desired to impregnate the fibers per unit time and all the powder particles previously introduced which have not been impregnated into the fibers are continuously reintroduced into the fluidized bed without any change in the supply flow rate of fresh powder particles.

8 Claims, 1 Drawing Sheet

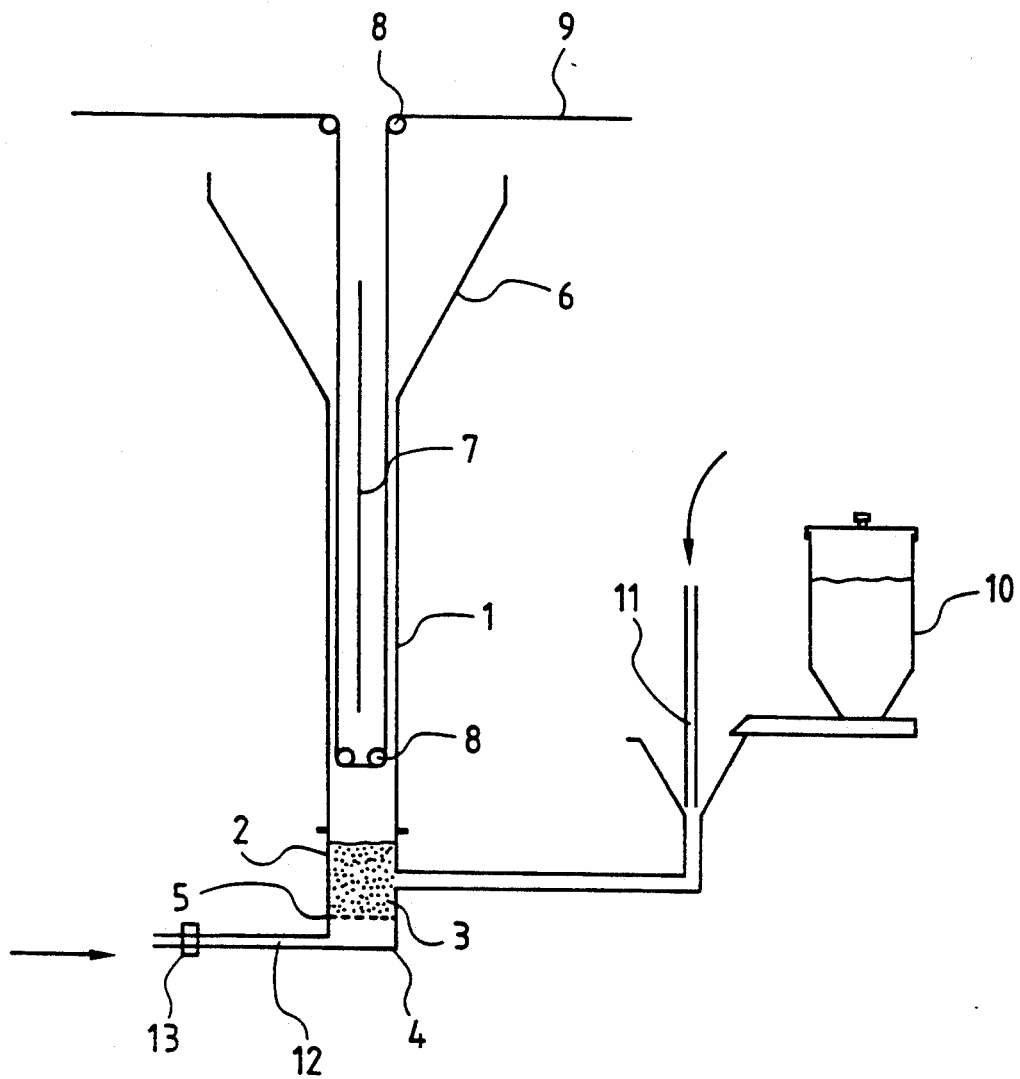

APPARATUS AND PROCESS FOR IMPREGNATING FIBERS WITH AN AEROSOL OF ELECTROSTATICALLY CHARGED POLYMER POWDER PARTICLES

BACKGROUND OF THE INVENTION

The present invention relates to a continuous process for impregnating fibers and its implementation device.

It is already known how to continuously impregnate fibers by different techniques such as passing the fiber through the polymer in a melted state; passing the fiber through a liquid solution or suspension containing the polymer; or passing the fiber through a suspension of the powdered polymer in a gas.

Such operations are then followed by a heat treatment producing the polymer in a state which permits the penetration of the latter into the fiber and shaping operations such as molding.

Now, the first two techniques have at least one of the following disadvantages, in particular when the polymer is thermoplastic:
- uneven and non-homogeneous sheathing of the fiber leading subsequently, during heat treatment, to an uneven and non-homogeneous impregnation and, consequently, to mediocre properties especially with aging;
- need for eliminating the liquid which has been used for putting the polymer in a solution or in suspension, this elimination being able to be carried out only with appropriate heating devices also optionally combined with recovery devices, or even recycling devices;
- difficulty in getting rid of residual traces of liquid and formation of pores which are detrimental to a good adherence between the fibers and polymer matrix and, therefore, to good mechanical properties; or
- delicate control of the respective weight or volume ratio of polymers and fibers. Now, such a control is a determining factor in the operation of a continuous process for impregnating fibers.

The technique of impregnation by passing the fiber through a suspension of powdered polymers in a gas must be separated into two categories according to the nature of the suspension, namely, aerosols and fluidized beds.

These two forms of suspensions where particles or micro-particles of powder are momentarily dispersed in a gaseous continuum have particular characteristics. Amongst others, the fluidized bed has a horizontal upper surface similar to a liquid in a container. The concentration of a fluidized bed relative to the volume that it occupies has no meaning, as it does for a liquid, unlike an aerosol.

The impregnation of fibers in a fluidized bed has the same disadvantages as regards the control of the polymer weight or volume ratio taken up by the fibers as impregnation in a liquid suspension. This ratio being a function, separately or simultaneously, of the duration of immersion in the solution, the liquid suspension or the fluidized bed; the concentration of the solution or of the liquid suspension; and the efficiency of the device used to eliminate the excess polymer taken up.

When it is necessary to vary the duration of the immersion, it is, in general, the geometry and the trajectory of the fiber in the impregnation medium which must be modified if the speed at which it passes through is not changed. The constant maintenance of the ratio depends on the homogeneity and the concentration of polymers of the impregnation medium and of the maintenance of these. The creation of a fluidized bed is theoretically possible with all powders, but has some practical difficulties. Certain polymers which are very finely powdered and lumpy, such as novolak phenolic resins, fluidize very poorly. Further, powdered polymers which are subjected to treatment by a liquid or have a small percentage of liquid added to them (which is common practice with powdered thermosetting plastics) cannot be fluidized or put in liquid suspension or in solution.

On the other hand, these powders which are difficult to fluidize can be put in an aerosol suspension without modification of the initial formulation or granulometry.

The known processes using an aerosol suspension as an impregnation medium propose devices for regulating the concentration which thus permits the quantity of polymer powder taken up by the fiber to be controlled. All these processes require an adjustment which links the overall concentration in the impregnation chamber of the aerosol suspension and the polymer - fiber take up ratio. This adjustment must be redone after each change of fiber or polymer type and according to the capture conditions of the fiber. Among these impregnation processes in an aerosol medium which require this adjustment, there must be mentioned those which generate the aerosol suspension by drawing the impregnating medium into a separate fluidized bed. The recycling of the non-fixed polymer powder of the aerosol part into the fluidized bed does not alone exclude the need for adjustment.

It would, therefore, be desirable to have at one's disposal a process for impregnating fibers with a polymer powder, the process not requiring adjustment yet providing for a very even impregnation. Furthermore, it would be desirable to have a process which will carry out this impregnation at high speed and at very low cost.

SUMMARY OF THE INVENTION

The present invention is a continuous process for impregnating fibers with a polymer powder. In the process, fibers are circulated or passed through an aerosol to effect the impregnation of the fibers. The aerosol is generated or passed through a fluidized bed which is contained in an earthed fluidization vessel. The particles constituting the fluidized bed are such as to electrostatically charge the polymer powder's particles carried in the aerosol. The aerosol is provided with a supply of new powder particles equal to that with which it is desired to impregnate the fibers per unit time. All the powder particles previously introduced but not impregnated into the fibers are allowed to be continuously reintroduced into the fluidized bed without modification of the supply flow rate of new powder particles.

The fibers, insofar as a continuous process is concerned, will generally be long and will usually appear in the form of threads, ribbons, filaments or yarns, for example.

The polymer powders used can be of any type, as for example a thermosetting or a thermoplastic polymer powder may be used. The granulometry of the powders can range for example up to 350 $\mu$m but will preferably be less than 250 $\mu$m.

As noted, the fibers to be impregnated can be of any type or composition, it being understood, however, that the impregnation of the fibers will generally be intended to strengthen them, the fibers themselves will preferably be highly resistant such as glass, carbon or aramide fibers, such as KEVLAR ®.

The aerosol is generated or supplied in a chamber in which the fibers will circulate or pass through. The chamber can be of an open or closed type depending upon the apparatus used, as will be discussed hereafter.

An aerosol is the equivalent of a vapor for the corresponding liquid, that is, an aerosol occupies the volume that is made available to it. It is, therefore, usually defined by its concentration of solid particles.

The polymer powder's particles according to the present invention can be needle-shaped but preferably are spherical or near spherical in form. In the case of a spherical or near spherical form, their diameter, as indicated above, is preferably less than 250 μm.

According to a characteristic of the present invention, the aerosol is passed through a fluidized bed of charging particles which impart an electrostatic charge upon the polymer powder particles suspended in the aerosol. The fluidized bed classically includes a fluidization vessel, an air-permeable membrane and an air generator. The fluidized bed behaves like a liquid and is, therefore, characterized in particular by a horizontal upper surface.

The vessel containing the particles which constitute the fluidized bed can be of any form, for example parallelepiped, but is preferably cylindrical and has in its lower part a perforated or porous air-permeable membrane, as well as a compressed air generator (air chamber).

The fluidized bed can also contain a pressure sensor connected to the vessel, such as preferably a static pressure sensor. Optionally, the pressure sensor may also be connected to a recorder.

The particles constituting the fluidized bed can be of any form, such as grains or slivers, but are preferably spherical in shape. Their size will depend on the granulometry and the density of the powder. For example, in the case where the particles of the fluidized bed are glass beads, they may have a diameter of between 100 to 200 μm for a polyamide powder 6 having an average diameter of less than 20 μm. The glass beads constituting the fluidized bed may be, for example, from 800 to 1000 μm for polymers having a diameter of less than 250 μm; and beads of up to 2 mm in diameter can be used for powders having larger particle diameters.

The load of the beads in the vessel will be for example 1400 g of glass beads, on the range of 800 to 1000 μm in diameter, for a cylindrical vessel having a diameter of about 100 mm and for a fluidization air flow rate of 300 to 800 liters/minute.

According to one of the essential characteristics of the present invention, the fluidization vessel is earthed.

The nature of the fluidization vessel as well as the nature of particles constituting the fluidized bed has a significant influence on the quality of the impregnation. Particularly good results are obtained when a brass vessel and glass beads are used.

The aerosol, thus obtained, has a strong negative charge. That is why once the fibers have passed through the aerosol they will be advantageously positively charged. In a general way, the fibers will be charged to an opposite polarity to that of the aerosol according to known methods.

The process according to the present invention is a continuous process, there are, therefore, three distinct phases: the start-up phase, the continuous operations phase, and the stop phase.

During the start-up phase, the impregnation in uneven. After a certain time, the continuous operations phase is reached and an equilibrium is achieved, it is then no longer necessary to modify in any way the operating parameters of the process described above.

According to a characteristic of the present invention, the aerosol is provided with a supply of new powder particles equal to that which is desired to impregnate the fibers per unit time. For example, for a circulation of fibers of 1 meter/minute, if an impregnation of one gram per meter is desired, a quantity of new powder particles equal to 1 gram/minute will be provided through the intermediary of the fluidized bed. This supply of new polymer powder particles can be carried out by any suitable means, for example a dosing scale coupled to a pneumatic injector.

According to another characteristic of the process described above, all of the powder particles introduced but not fixed to or non-impregnated on the fibers are allowed to be continuously reintroduced or returned to the fluidized bed without any modification of the polymer powder particle's supply flow rate. The continuous reintroduction of the non-impregnated polymer powder particles can be carried out by any known device, for example those used for recycling, it being understood that the reintroduction of the non-fixed polymer particles has no influence on the supply of new polymer powder particles.

The vessel or chamber in which the aerosol is injected and in which the fibers circulate or pass through can be of any suitable form, size, and arrangement. The vessel will be in communication with a fluidized bed from which is produced the aerosol and, as already indicated, the aerosol will occupy all of the volume made available to it in the vessel.

The chamber can be open or closed and can be arranged either horizontally or vertically. An open horizontal chamber may be used, and can be advantageously modular so as to be able to adjust its length, the chamber having mounted at its upper end an elutriator or other means, such as an enlarged conical section, which is capable of separating out the polymer powder particles from the aerosol and reintroducing them to the fluidized bed. At the level of the elutriator, the "aerosol" loses its quality and the non-fixed particles settle out and fall back into the fluidized bed and are regenerated to form part of the new aerosol, thus the non-fixed polymer particles are continuously reintroduced into the fluidized bed and regenerated.

In such a case, the reintroduction of the non-fixed powder particles into the fluidized bed does not require any apparatus other than the elutriator. A vessel which is closed except for the openings for through-flow of the fibers can equally well be used, arranged horizontally and in communication with the solid aerosol.

In this case an endless screw type device can be used, for example, in order to recover the non-fixed polymer powder particles from the base of the chamber, the lower part of which advantageously has a V-shaped section, and to reintroduce them into the fluidized bed.

In the preferred conditions for implementing the process described above, a vertical chamber is used which embodies at its upper end an elutriator and which contains in addition a wall which separates the chamber in two, the wall extending for example from the elutriator to the vicinity of, for example 20 or 50 cm from, the surface of the fluidized bed. In such a case, the fibers can be circulated or passed, for example, in both halves of the separated chamber. Such a process provides for a continuous, even impregnation at a feed-through speed which may reach 100 meters/minute. This process is particularly inexpensive and results in savings in time, cost and fewer rejected products.

An advantageous device according to the present invention has an air chamber supplied under pressure with air for fluidization, optionally regulated by a flowmeter, for example with a diaphragm, surmounted by a porous wall of circular section, itself surmounted by a circular vertical vessel of approximately the same diameter, preferably made of brass and earthed, filled with particles constituting the fluidized bed, for example glass beads, this vessel containing, if desired, porous walls, a static pressure sensor as well as, about halfway up the bed, a device for injection of the impregnation powder, the fluidized-bed vessel being itself surmounted, also vertically, by a long cylinder terminating in a funnel (elutriator) widening towards the top, separated lengthwise into two parts by a transverse wall. The transverse wall is spaced a predetermined distance from the surface of the fluidized bed. The device also contains a return means for permitting circulation of the fibers, so that the latter, arriving through the funnel, descend into the impregnation chamber by means of one or two returns, pass under the separation wall and then ascend through the other half of the chamber and exit out the funnel end.

Also a subject of the present invention is a device especially designed for the implementation of the process described above, characterized in that it embodies an air chamber surmounted by an approximately horizontal porous membrane which is air-permeable and serves as a base for an earthed fluidization vessel containing the particles constituting the fluidized bed, the vessel being in communication with a chamber containing means for circulating the fibers and means for reintroducing the non-impregnated particles into the fluidized bed.

Devices can also be used such as those described in European Patent Application No. 0,246,167.

In the preferred conditions, the device described above contains a brass fluidization vessel and the particles constituting the fluidized bed are of glass. The arrangement of the impregnation chamber can be horizontal but, preferably, is vertical; in the latter case, the chamber will advantageously be of cylindrical form and will be surmounted by an elutriator, in particular in the form of a funnel. The chamber can be advantageously separated into two approximately equal parts by means of a partition, this also being vertical.

The invention will be better understood if taken in conjunction with the attached drawing and the detailed description which follows.

BRIEF DESCRIPTION OF THE DRAWING

The figure is a schematic representation of a device for implementing the process according to the present invention, containing a vertical impregnation chamber.

DETAILED DESCRIPTION OF THE PREFERRED EMBODIMENT

In the figure there can be seen an impregnation chamber 1 arranged vertically and connected to a fluidization vessel 2 which is vertical, earthed, and contains particles that constitute a fluidized bed 3. The particles of the fluidized bed 3 are constantly in movement due to air injected into an air chamber 4 and pass through holes in a porous wall 5 in order to generate an aerosol which rises to the top of the chamber 1 which is surmounted by an elutriator 6 in the form of a funnel directed downwards and back into the chamber 1.

The chamber 1 is separated into two approximately equal parts by a vertical partition 7.

Return means 8 which provide for the circulation of fibers 9 are also depicted in the figure. The supply of polymer powder particles has also been schematized, here using a dosing scale 10, providing a constant supply of powder equal to the supply of powder taken up by the fibers 9. The powder particles are inserted into the fluidized bed by means of compressed air 11. Compressed air 12 is also injected into the air chamber 4 and regulated by a flowmeter 13, which may be, for example, of a diaphragm or other type.

Attached devices such as yarn reels, fiber tension regulating devices, infrared ovens, roll mills, cooling beds, containers, well known from the state of the technology and by one skilled in the art, have not been represented.

The preceding invention has been described by way of a preferred embodiment. It will be apparent to those skilled in the art that modifications can be made without departing from the scope of the invention, which is to be limited only by the following claims.

What is claimed is:

1. A continuous process for impregnating fibers with polymer powder particles wherein said fibers are passed through an aerosol of said polymer powder particles, said process comprising the steps of:

passing said polymer powder aerosol through a fluidized bed of charging particles contained in an earthed fluidization vessel;

supplying said polymer powder particles into said aerosol at a rate which is substantially equal to a rate at which said polymer powder particles are impregnated in said fibers, said earthed fluidization vessel and said charging particles electrostatically charging said polymer powder particles of said aerosol;

passing said fibers through said polymer powder aerosol in a chamber connected to said earthed fluidization vessel after said polymer powder aerosol has passed through said fluidized bed; and continuously reintroducing into said aerosol during said supplying step any polymer powder which was not impregnated into said fibers, said continuous reintroducing step being conducted independently of said supplying step.

2. A continuous process for impregnating fibers with a polymer powder according to claim 1, wherein said earthed fluidization vessel is brass and said charging particles are glass beads.

3. A device for implementing the continuous process according to claim 6 wherein fibers are passed through an aerosol so as to be impregnated with polymer powder particles carried by said aerosol, said device comprising:

means for supplying air to said device;

an earthed fluidization vessel in communication with said air supplying means;

an air-permeable membrane disposed between said air supplying means and said earthed fluidization vessel;

a chamber connected to and extending from said earthed fluidization vessel, said chamber being in communication with said earthed fluidization vessel;

charging particles located in said earthed fluidization vessel for passing said polymer powder aerosol therethrough to impart a charge to said polymer powder particles;

means connected to said device for passing said fibers through said chamber and said polymer powder aerosol;

means for supplying said polymer powder aerosol connected to said earthed fluidization vessel, said aerosol supplying means connected such that said aerosol is passed through said charging particles and is then passed through said chamber; and means connected to and in communication with said chamber for returning to said earthed fluidization vessel a quantity of said polymer powder particles which were previously supplied into said aerosol but not impregnated into said fibers.

4. A device according to claim 3, wherein said earthed fluidization vessel is brass and said charging particles are glass beads.

5. A device according to claim 3, wherein said chamber is a vertical chamber.

6. A device according to claim 3 wherein said returning means comprises an elutriator.

7. A device according to claim 3 further comprising means disposed in said chamber for partitioning said chamber into two approximately equal parts.

8. A device according to claim 3 wherein said air-permeable membrane is oriented to be substantially horizontal so as to define a base of said earthed fluidization vessel.

* * * * *

UNITED STATES PATENT AND TRADEMARK OFFICE
CERTIFICATE OF CORRECTION

PATENT NO. : 5,328,736
DATED : July 12, 1994
INVENTOR(S) : Alain Charles and Emile Morel It is certified that error appears in the above-indentified patent and that said Letters Patent is hereby corrected as shown below:

Column 6, line 59, delete "6" insert ---- 1 ----.

Signed and Sealed this

Twenty-seventh Day of September, 1994

Attest:

BRUCE LEHMAN

*Attesting Officer*            *Commissioner of Patents and Trademarks*